United States Patent [19]
Maggiora et al.

[11] Patent Number: 5,969,433
[45] Date of Patent: Oct. 19, 1999

[54] THEFT PREVENTING AND DETERRING SYSTEM AND METHOD USING A REMOTE STATION

[76] Inventors: David Raymond Maggiora, 439 W. Avenida De Las Flores, Thousand Oaks, Calif. 91360; Dennis William Polinski, 5434 Zelzah Ave. #303, Encino, Calif. 91316

[21] Appl. No.: 08/839,058

[22] Filed: Apr. 23, 1997

[51] Int. Cl.⁶ .................................................. B60R 25/00
[52] U.S. Cl. ........................................ 307/10.5; 180/287
[58] Field of Search ................... 307/10.1–10.5; 180/287; 340/425.5, 825.44, 426, 825.69, 825.72, 825.54

[56] References Cited

U.S. PATENT DOCUMENTS

| | | |
|---|---|---|
| 4,737,763 | 4/1988 | DeFino et al. . |
| 4,754,255 | 6/1988 | Sanders et al. . |
| 4,884,055 | 11/1989 | Memmola . |
| 4,897,642 | 1/1990 | DiLullo et al. . |
| 5,003,317 | 3/1991 | Gray et al. . |
| 5,218,367 | 6/1993 | Sheffer . |
| 5,223,844 | 6/1993 | Mansell et al. . |
| 5,307,048 | 4/1994 | Sonders .................................... 307/10.2 |
| 5,334,974 | 8/1994 | Simms et al. . |
| 5,349,329 | 9/1994 | Smith . |
| 5,382,948 | 1/1995 | Richmond ............................... 307/10.2 |
| 5,404,129 | 4/1995 | Novak et al. . |
| 5,495,925 | 3/1996 | Enk . |
| 5,515,043 | 5/1996 | Berard et al. . |
| 5,519,255 | 5/1996 | Burtch et al. ........................... 307/10.2 |
| 5,534,845 | 7/1996 | Issa et al. . |
| 5,543,776 | 8/1996 | L'Esperance et al. . |
| 5,550,551 | 8/1996 | Alesio . |
| 5,557,254 | 9/1996 | Johnson et al. . |
| 5,559,491 | 9/1996 | Stadler . |
| 5,559,493 | 9/1996 | Karnwie-Tuah . |
| 5,742,227 | 4/1998 | Escareno et al. ....................... 307/10.2 |

FOREIGN PATENT DOCUMENTS

| | | |
|---|---|---|
| 0 413 090 | 2/1991 | European Pat. Off. . |
| 0 652 542 | 5/1995 | European Pat. Off. . |
| 2 218 835 | 11/1989 | United Kingdom . |
| WO 95/22131 | 8/1995 | WIPO . |

OTHER PUBLICATIONS

Advertisement, Stolen Cars Phone Home, *Machine Design*, vol. 62, No. 18, Sep. 6, 1990, pp. 78–79.
Copy of International Search Report issued in connection with Applicant's corresponding PCT application Serial No. PCT/US98/00726.

*Primary Examiner*—Richard T. Elms
*Attorney, Agent, or Firm*—Merchant & Gould

[57] ABSTRACT

Upon the occurrence of a predetermined event, the protection system will automatically disable the vehicle or object that the system is installed in. Several sensors and events can be monitored by the system simultaneously, and the system can be automatically or manually programmed to selectively intervene or monitor events as they occur. Radiolocation systems, such as GPS and TELETRAC(™) are used to monitor status and send commands.

2 Claims, 3 Drawing Sheets

THEFT PREVENTING AND DETERRING SYSTEM AND METHOD USING A REMOTE STATION

BACKGROUND OF THE INVENTION

1. Field of the Invention

This invention relates in general to a protection system, and more particularly to a method and apparatus for protecting vehicles and trailers from unauthorized access.

2. Description of Related Art

Vehicle theft is a major crime problem in the United States. Further, theft of merchandise being transported in trailers, in addition to the value of the vehicles used to transport the merchandise, is also a law enforcement concern. Approximately one billion dollars is spent annually on law enforcement efforts to address vehicle theft and related crimes.

Although vehicle security systems, vehicle location systems such as LOJACK (™), and vehicle alarms make theft of cars and trailers more difficult, these systems do not deter professional vehicle thieves. The chance of apprehension is small, and the rewards of a successful theft are so great, that present systems do not significantly prevent car theft.

Conventional security devices are plagued with numerous drawbacks. First, most vehicle thieves are easily able to defeat the present systems. Second, most car alarms, or suspicious activity around a tractor-trailer, are ignored by the public at large. Further, the present systems do not have a means to stop the thief once the car has been stolen.

The visibility of an alarm, keypad, or other devices that inform thieves that an alarm exists is also a problem, since any visible alarm that deters casual theft also informs professionals that an alarm needs to be disabled.

It can be seen, then, that there is a need for a better means to prevent or deter vehicle theft. It can also be seen, then, that there is a need for a system that is not readily visible to the car thief.

SUMMARY OF THE INVENTION

To minimize the limitations in the prior art described above, and to minimize other limitations that will become apparent upon reading and understanding the present specification, the present invention discloses a powerful device and method for protecting a vehicle.

The present invention minimizes the above-described problems by using a controller, sensor, and actuator arrangement on the vehicle to sense when an action occurs that is outside of typical operating conditions. Once the sensor detects such activity, a signal is sent to alert the controller, which then activates an actuator to partially or totally disable the vehicle from being moved.

A device in accordance with the principles of the present invention comprises a sensor, an actuator, a controller, and a transceiver. The sensor generates a signal that is detected by the controller, which sends the signal to the transceiver. The transceiver receives a signal from a monitoring station, and based on the value of the signal received from the monitoring station, regulates the controller to send a second signal to the actuator. The actuator performs a function related to the operation of the vehicle, and either partially or completely disables the vehicle operations.

A method in accordance with the principles of the present invention comprises the steps of generating a first signal at a sensor and sending that signal to a controller. Based on the value of the signal, the controller then sends a signal to an actuator, the actuator performing a function to at least partially disable the vehicle.

One object of the present invention is to provide better vehicle protection techniques. It is a further object of the invention to reduce the number of vehicle thefts. It is a further object of the invention to provide better trailer protection techniques.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

Overview

The present invention is a protection system for vehicles. The protection system typically uses the TELETRAC(™) system for location and transmission of messages between the vehicle and a monitoring station, but the present invention can also use GPS or other means to communicate with vehicles.

The TELETRAC system is a radiolocation network. The system consists of transceivers, a dispatch workstation and the TELETRAC network. The TELETRAC network is an RF network which connects transceivers in the field (generally located in vehicles) with a centralized dispatch workstation.

From the workstation, an operator can locate the transceiver while sending or receiving messages. The transceiver can be configured to send messages or receive output control commands for a wide variety of applications. The workstation software allows the operator to configure the workstation and customize the message set for the circumstances of his daily operations.

A workstation consists of a computer system, a CPU, monitor and a keyboard. The workstation receives signals via the telephone network. The telephone network originates at Gateway, TELETRAC's central processing station.

A panic situation for a vehicle is an alert condition, or a condition that is not typical for a given vehicle. When this alert condition occurs, the operator is informed by a red flag on the workstation screen, consuming one half of the screen. Information such as location, time and messages are displayed on the workstation monitor. A detailed map is displayed at all times on the computer screen. Icons pop up on this map in order to display the location of the TELETRAC locating unit usually hidden within a vehicle.

Detailed Drawings

Figure 1:
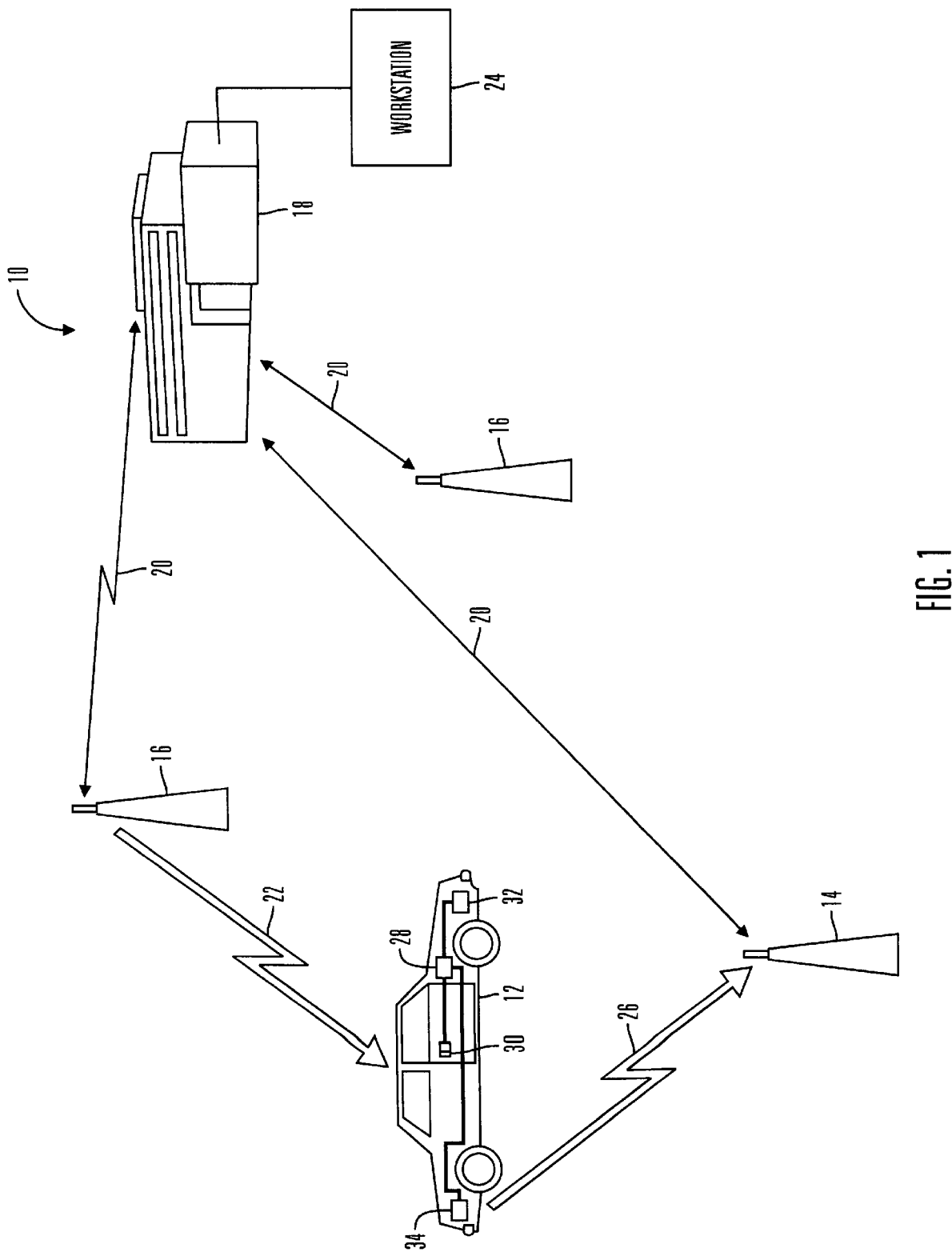
FIG. 1 is a diagram of a typical system using the present invention.

FIG. 1 illustrates an exemplary system according to the present invention. In the preferred embodiment, a location-based communications network 10, such as the AirTouch TELETRAC network, is used to communicate with remote sites 12. The network 10 could also be the Global Positioning System (GPS) or other satellite or land-based network 10. Such networks 10 have proved useful in locating vehicles with a high degree of precision in a short period of time. Similarly, they are used in the present invention to locate or identify remote sites 12 with a high degree of precision. Remote site 12 can be a car, tractor-trailer, house, boat, airplane, or other object that tracking and reporting is desired for.

The wireless communications network 10 includes both receiving sites 14 and transmitting sites 16 that are coupled to a control center 18. The transmit sites 16 and receive sites 14 are coupled to the control center 18 using a hardline cable 20 or the like. The coupling between the transmit sites 16, receive sites 14 and the control center 18 can also be an RF link, a baseband link, or any other communications link to transmit the data from the receive sites 14 to the control center 18.

Generally, the remote sites 12 are polled by messages 22 transmitted from the transmit sites 16, wherein the polling function may be initiated by an operator's workstation 24 coupled to the central site or in response to a request by the remote site 12 itself. These polling messages 22 include a unique identifier for each remote site 12. In response to receiving the polling message 22 with its unique identification, the remote site 12 transmits a response message 26 to the receive sites 14 in a particular time slot indicated by the polling message 22. The response message 26 is received at differing time intervals by multiple receive sites 14, and the response message 26 and the time intervals are transmitted to the control center 18. The control center 18 resolves the location of the remote site 12 using a multilateration method with the time intervals from receive sites 14. The resolved location and the response message 26 may then be transmitted to an operator's workstation 24 for further action.

The operator's workstation 24 can automatically perform many of the polling functions and database calculations with or without human intervention. The workstation 24 can also automatically store and retrieve items from a database if necessary for a specific application of the invention.

Remote site (vehicle) 12 is equipped with a controller 28 that is connected to a sensor 30. Sensor 30 may be a door latch, a motion sensor, a speed sensor, a weight sensor, a sound sensor, a heat sensor, a light sensor, a moisture sensor, or any other type of sensor that will report the status of an event to be monitored. There can be multiple sensors 30 on the vehicle 12.

Controller 28 is also coupled to actuator 32 that will partially or totally disable the vehicle 12. There can be multiple actuators 32 on the vehicle 12. The actuator 32 can be a fuel line stopcock, a check valve on the brake lines of the vehicle 12, a timing disrupter to make the engine of the vehicle 12 run poorly, a check valve, a relay, a shut-off valve, an electrical switch, a mechanical switch, a vacuum switch, a pressure switch, or some other device that affects the operation of the vehicle 12.

Controller 28 is also coupled to transceiver 34. Transceiver 34 communicates with the monitoring and location system 10, to report status of the sensors 30 via response messages 26 and receive messages 22 from the system 10.

The transceiver 20 can also be used with the Global Positioning System (GPS), or other national or international tracking systems.

Basic Operation of the System

Controller 28 is programmed via the monitoring system to monitor sensor 30 for the occurrence of a given event, e.g., motion of the vehicle between the hours of 9:00 and noon, when the owner of the vehicle 12 is at work. Motion of the vehicle 12 between the times indicated would likely indicate that the vehicle 12 is being stolen. Sensor 30 would detect motion of the vehicle 12, and report the motion to controller 14. Controller 14 would report the motion to transceiver 20, which would report the motion to the monitoring system. The monitoring system would send a command back to the vehicle 12, via the transceiver 20, to activate the actuator 18 to partially or totally disable the vehicle 12. The controller 14 would interpret the command and send a signal to actuator 18 to disrupt the fuel line, begin the check valve operation on the brake lines, or other function to disable the vehicle.

Since there can be more than one sensor 30 and more than one actuator 18 on the vehicle 12, there can be more than one mode of operation for the system 10. Further, the system 10 can be programmed to report certain sensor 30 inputs, immediately begin disabling the vehicle 12 upon receipt of other sensor 30 inputs, or any combination of responses by the system 10 desired by the owner of the vehicle 12.

System 10 is designed primarily for use with tractor-trailer arrangements to protect the cargo in the tractor-trailer from theft. Thus, the following examples discuss connection and disconnection of the trailer from the tractor as a primary sensor 30 input.

Operation of the System

Figure 2:
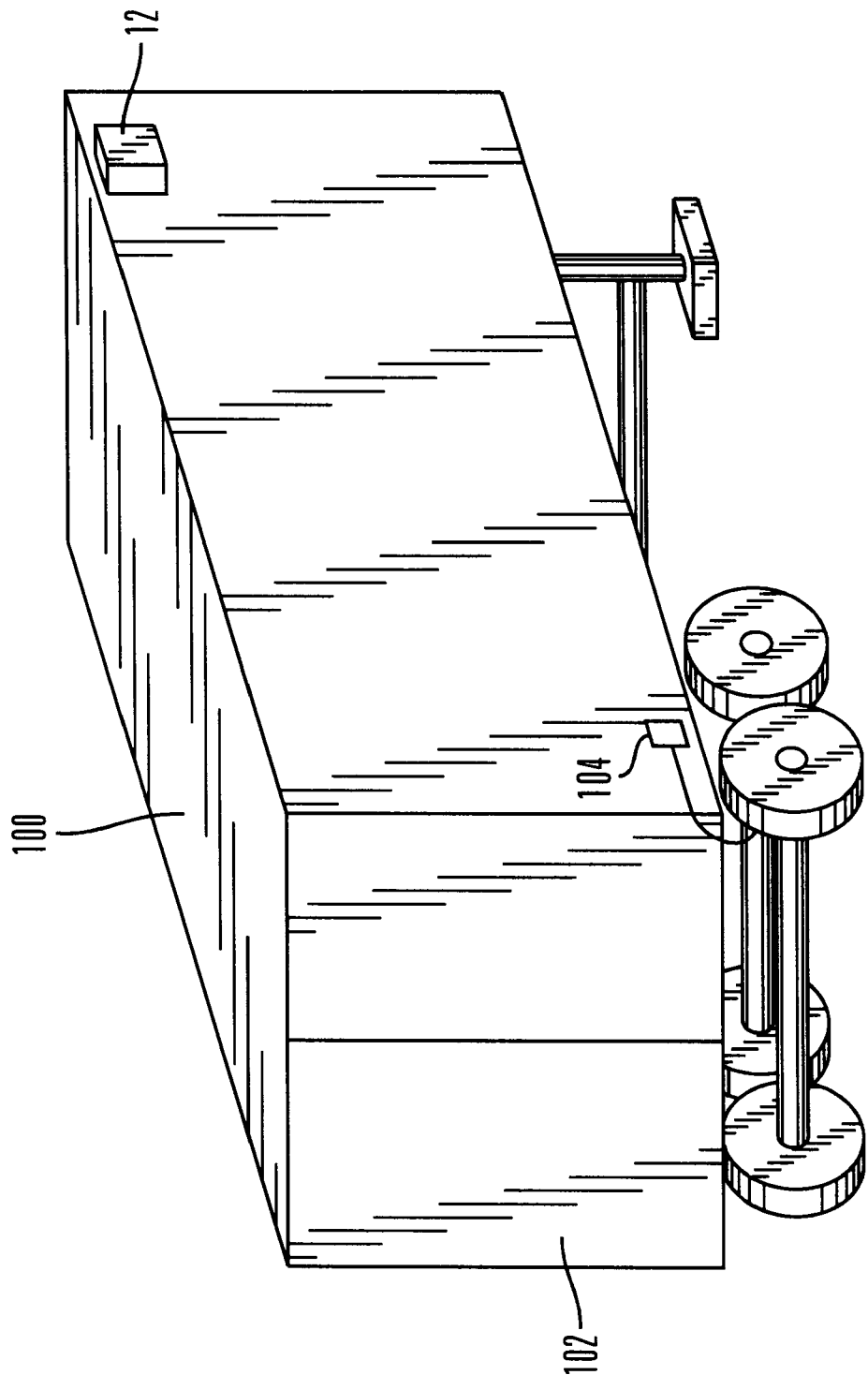
FIG. 2 illustrates a trailer equipped with the present invention.

FIG. 2 illustrates a trailer equipped with the present invention.

Trailer Protection System

FIG. 2 shows a trailer 100 equipped with system 10 of the present invention. There are several modes of operation of controller 12 when installed on a trailer 100, as well as some general status and activation signals which may be sent to controller 12 at any time.

In general, a status check of trailer 100 may be performed at any time. A status check may include the position of doors 102, e.g., open or closed, position of trailer 100, or other information. Further, valve 104, which controls the brakes on trailer 100, may be tripped at any time, preventing trailer 100 from being moved from its present location, or from continuing to move from its present location. Valve 104 can also be reset to allow trailer 100 to move. Further, controller 12 can be reset to a normal mode.

Pre-Connection to Truck

Prior to connection to a truck, controller 12 in trailer 100 has three modes that it can be commanded to: Day-to-Day Mode, Alert Mode, and Alert/Disable Mode. Each mode of controller 12 will be described below.

Day-to-Day Mode

The Day-to-Day mode (DDM) of controller 12 allows for an everyday, "baseline" mode of operation for controller 12. The DDM allows for automatic sending of messages from controller 12 to control center 18 upon certain events occurring, e.g., doors 102 opening, doors 102 closing, etc. Some of these messages may be sent with a delay, e.g., when doors 102 are opened or closed, the message is sent with a delay to allow the trailer operator or loader to seat doors 102 properly. If doors 102 do not seat properly on the first try, the controller 12 does not want to send five or six messages to show that the doors 102 were opened and closed five or six times within a few minutes, and thus, a delay is built into the controller 12 to allow the doors to be seated properly before the message is sent. The delay does not have to be built into every message sent by controller 12.

Controller 12 will send a message to control center 18 once the connection is made to a truck.

Alert Mode

In alert mode, the controller 12 is armed to send messages of a different type or a different security level depending on the events being monitored by controller 12. For example, once controller 12 is in alert mode, doors 102 are monitored for an "open door" condition, and once this condition occurs, controller 12 sends a message to control center 18 that an unauthorized entry into trailer 100 has occurred. This signal acts as a silent alarm to the operator at control center 18 that action needs to be taken to protect trailer 100 and the cargo that trailer 100 may be carrying.

Disable Mode

In Disable Mode, controller 12 takes steps to alert control center 18. For example, if doors 102 are opened in ADM, a signal is sent to control center to indicate that an unauthorized entry has been made into trailer 100, as is done in Alert Mode. Further, controller 12 sends a panic message, which is generic to the TELETRAC system, to let the control center 18 know that there is a situation that requires immediate attention. In both alert mode and ADM, the controller 12 will send a signal to control center 18 to indicate that doors 102 are closed, to enable the opening of doors 102 to indicate an alert.

Alert/Disable Mode

In Alert/Disable Mode (ADM), controller 12 takes active steps to disable trailer 100 from moving. For example, if doors 102 are opened in ADM, a signal is sent to control center to indicate that an unauthorized entry has been made into trailer 100, as is done in Alert Mode. However, ADM also sends a signal to valve 104 to disable the trailer 100 from moving, which allows law enforcement to arrive at the scene without trailer 100 moving from its present position. Further, controller 12 sends a panic message, which is generic to the TELETRAC system, to let the control center 18 know that there is a situation that requires immediate attention. In both alert mode and ADM, the controller 12 will send a signal to control center 18 to indicate that doors 102 are closed, to enable the opening of doors 102 to indicate an alert.

Legal Connection to Truck

Figure 3:
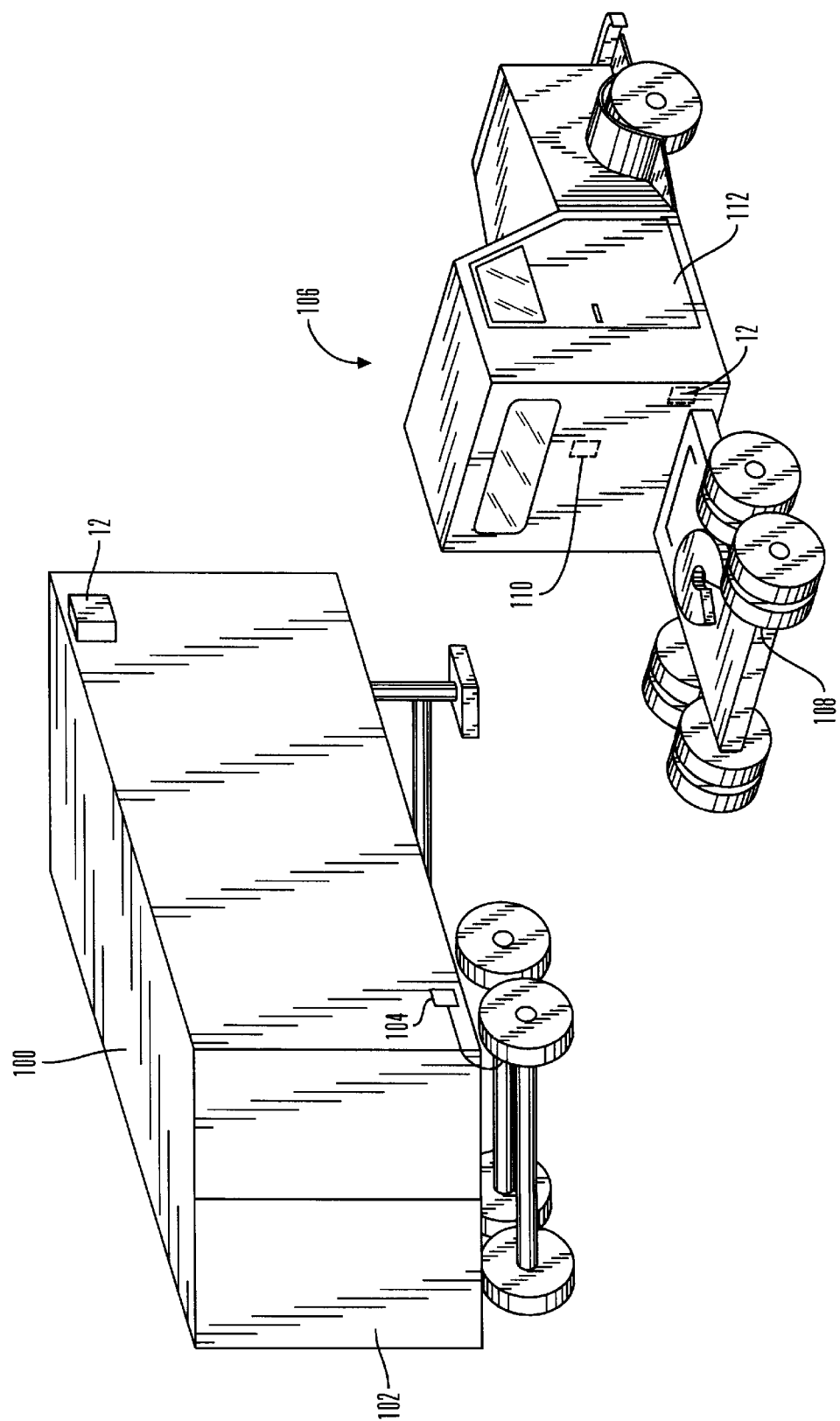
FIG. 3 shows a trailer and truck combination using the present invention.

FIG. 3 shows a trailer and truck combination using the present invention.

Once a legal connection to a truck has been made, the controller 12 installed on trailer 100 must adapt to a new set of circumstances and send messages to control center 18 based on those circumstances and the mode of operation that controller 12 has been programmed to operate in.

Day-Day Mode

Controller 12 sends various messages to control center 18 in this mode. Once the trailer 100 has been connected to truck 106, controller 12 sends a message to control center 18 to inform control center 18 that a connection has been made.

If the trailer 100 for some reason becomes disconnected from truck 106, for example, at the destination for trailer 100, controller 12 sends a message to control center 18 that trailer 100 has been disconnected from truck 106.

Some of these messages may be sent with a delay, e.g., when doors 102 are opened or closed, the message is sent with a delay to allow the trailer operator or loader to seat doors 102 properly. If doors 102 do not seat properly on the first try, the controller 12 does not want to send five or six messages to show that the doors 102 were opened and closed five or six times within a few minutes, and thus, a delay is built into the controller 12 to allow the doors to be seated properly before the message is sent. The delay does not have to be built into every message sent by controller 12.

Alert Mode

In alert mode, the controller 12 is armed to send messages of a different type or a different security level depending on the events being monitored by controller 12. For example, once controller 12 is in alert mode, doors 102 are monitored for an "open door" condition, and once this condition occurs, controller 12 sends a message to control center 18 that an unauthorized entry into trailer 100 has occurred. This signal acts as a silent alarm to the operator at control center 18 that action needs to be taken to protect trailer 100 and the cargo that trailer 100 may be carrying.

When trailer 100 is connected to truck 106, this event may not be authorized by the owner of trailer 100. Thus, in Alert Mode, trailer 100 sends a signal to control center 18 that an unauthorized connection has been made to trailer 100. Further, controller 12 will send a panic message to control center 18.

Disable Mode

In Disable Mode, controller 12 takes steps to alert control center 18. For example, if doors 102 are opened in ADM, a signal is sent to control center to indicate that an unauthorized entry has been made into trailer 100, as is done in Alert Mode. Further, controller 12 sends a panic message, which is generic to the TELETRAC system, to let the control center 18 know that there is a situation that requires immediate attention. In both alert mode and ADM, the controller 12 will send a signal to control center 18 to indicate that doors 102 are closed, to enable the opening of doors 102 to indicate an alert.

Alert/Disable Mode

In ADM, controller 12 will send an unauthorized entry signal to control center 18 when the doors 102 have been opened. Further, controller 12 will disable the trailer 100 by tripping the valve 104 to prevent movement of the trailer 100. Controller 12 also sends a panic message to control center 18 to inform the operator that the situation needs immediate attention.

If trailer 100 is somehow connected to a truck 106, and this event is undesired by the owner of trailer 100, controller 12 sends a message to control center 18 that an unauthorized connection has taken place for trailer 100. Controller 12 then sends a signal to valve 104 to allow the valve to prevent motion of the trailer 100. Controller 12 also sends a panic message to control center 18, and a "disable system active" signal to control center 18 to indicate that the trailer 100 is being disabled.

Other messages and scenarios can be modeled and programmed into controller 12 to allow controller 12 to meet the needs of homeowners, boat or car owners, or other devices that can be protected by controller 12. The above listed messages and scenarios are for illustration purposes only and are not meant to be exhaustive of the capabilities of controller 12.

Truck Protection System

The trailer 100 controller 12 of FIGS. 2 and 3 can work alone or in conjunction with a similar controller 12 that is programmed to work with a truck for hauling trailers 100.

The programming of a controller 12 to work with a truck 106 is slightly different than a controller 12 that is designed to work with a trailer 100.

General

FIG. 3 also shows truck 106 with a controller 12 installed. Truck 106 also has valve 108 which can be used to disable truck 106, similar to valve 104 on trailer 100. Other actuators can be used to disable truck 106, e.g., a switch that interrupts the timing for the engine of truck 106, an ignition relay that interferes with the engine performance of truck 106, or other actuators.

Controller 12 on truck 106 has similar general features to the controller 12 installed on trailer 100, such as a status check, valve 108 trip signal, reset valve 108 signal, and reset controller 12 to DDM.

Trailer Connection

As with the trailer 100, truck 106 may need to be monitored before it is connected to a trailer 100. There are various reasons for this, e.g., monitoring whereabouts of truck 106, monitoring additional hauling activity of truck 106, etc. However, controller 12 that is installed on truck 106 has additional modes of operation, because truck 106 will encounter different scenarios than trailer 100.

The mode of operation for truck 106 can be dependent on whether trailer 100 is connected. Once trailer 100 is connected, the pre-programmed mode of controller 12 becomes operable. Prior to connection of trailer 100, controller 12 is in a ready state, but typically does not become active in sending signals to control center 18 until trailer 100 is connected. However, controller 12 can be programmed to always send signals to control center 18 regardless of whether a trailer 100 is connected to truck 106.

Day-Day Mode

In the truck 106, the driver is an additional source of information to control center 18. Thus, systems 10 that are installed in trucks 106 can have a method for allowing the driver to indicate problems with truck 106, e.g., when truck 106 is being hijacked, etc. Thus, an additional switch 110 is installed in truck 106 that enables the driver to send a signal to control center 18 manually. This will also send a panic message to control center 18.

Controller 12 will also automatically send messages to control center 18 when a trailer 100 is connected or disconnected to truck 106.

Alert Mode

For controller 12 in truck 106, manual driver signals sent from truck 106 to control center 18 are the same in alert mode as they are in DDM, e.g., send a message and send a panic message to control center 18.

When a trailer 100 is connected to truck 106, controller 12 in truck 106 will send a message to control center 18 that a trailer 100 has been connected. However, when a trailer has been disconnected, this may indicate that the trailer or truck is being stolen, and thus, upon disconnection, controller 12 in truck 106 will send an unauthorized disconnect message to control center 18.

In alert mode, controller 12 in truck 106 can also monitor other functions, e.g., whether the driver is in the truck 106 or not, or whether passenger door 112 of truck 106 has been opened or not. These functions can give owners of trucks further information about the details of trucking runs that are currently unavailable. Upon the occurrence of a monitored event, e.g., opening of passenger door 112, a message is sent by controller 12 to control center 18.

Alert/Disable Mode

When controller 12 in truck 106 is in ADM, in addition to the driver alert message and panic message sent by controller 12 to control center 18, controller 12 sends a "disable system active" message to control center 18, and controller 12 will begin disabling truck 106 simultaneously with sending the messages. This disabling of truck 106 can be programmed with a delay to protect the driver, as a delay in the disabling of truck 106 will allow the driver to get away of the thief to drive some distance from the driver before the disabling feature begins taking effect. As described above, there are several methods for disabling truck 106.

When a trailer 100 is connected to truck 106, and controller 12 is in ADM, controller 12 in truck 106 will send a message to control center 18 that a trailer 100 has been connected. However, when a trailer has been disconnected with the controller 12 in ADM, upon disconnection, controller 12 in truck 106 will send an unauthorized disconnect message to control center 18, send a panic message to control center 18, send a "disable system active" message to control center 18, and begin disabling truck 106.

In ADM, to disable the truck, the controller 12 must determine whether the truck 106 is moving or stationary because the safety of the truck and driver/thief is a concern. If the truck 106 is moving, as determined by any number of sensor readings, e.g., parking brake off, speedometer reading, etc., then controller 12 will not disable truck 106 by sending a message to valve 108 (or any other disabling feature installed on truck 106). However, if truck 106 is stationary, also determined by any number of sensors, truck 106 will be disabled by valve 108, or whatever disabling feature is installed on truck 106, with a minimal delay.

In ADM, controller 12 in truck 106 can also monitor other functions, e.g., whether the driver is in the truck 106 or not, or whether passenger door 112 of truck 106 has been opened or not. These functions can give owners of trucks further information about the details of trucking runs that are currently unavailable. Upon the occurrence of a monitored event, e.g., opening of passenger door 112, an unauthorized function message is sent by controller 12 to control center 18, and a disable signal is sent to valve 108 to disable truck 106.

Alert/Hijack Mode

An additional programming mode for controller 12 in truck 106 is the Alert/Hijack Mode (AHM). In AHM, sending a manual signal from the driver alert switch 110 will send a message from controller 12 to control center 18, send a panic message to control center 18, and disable the truck 106. However, since the truck 106 is probably being hijacked, the driver may be in an unsafe condition if the thief finds out that truck 106 has been disabled. Therefore, truck 106 is only disabled after a delay programmed into controller 12. This delay can be armed by a first event, say, opening the driver door on truck 106, and then the delay timer can be activated by a second event, such as activating the foot brake of truck 106. The delay can be of variable length.

Once the delay timer has reached the trip point, the controller 12 must determine if the truck 106 is moving or is stationary. If the truck 106 is moving, shutting down the truck 106 is dangerous to the thief as well as to those driving around the truck 106. Thus, a gradual shutdown of the truck 106 will deter the thief from continuing on with truck 106. If the truck 106 is stationary, an immediate shutdown of the truck 106 will occur.

In AHM, connection of trailer 100 to truck 106 will send a message from controller 12 to control center 18. However, when a trailer has been disconnected with the controller 12 in AHM, upon disconnection, controller 12 in truck 106 will send an unauthorized disconnect message to control center 18, send a panic message and a "disable system active" message to control center 18, and begin disabling truck 106.

In AHM, to disable the truck, the controller 12 must determine whether the truck 106 is moving or stationary because the safety of the truck and driver/thief is a concern. If the truck 106 is moving, as determined by any number of sensor readings, e.g., parking brake off, speedometer reading, etc., then controller 12 will not disable truck 106 by sending a message to valve 108 (or any other disabling feature installed on truck 106). However, if truck 106 is stationary, also determined by any number of sensors, truck 106 will be disabled by valve 108, or whatever disabling feature is installed on truck 106, with a minimal delay.

In AHM, controller 12 in truck 106 can also monitor other functions, e.g., whether the driver is in the truck 106 or not, or whether passenger door 112 of truck 106 has been opened or not. These functions can give owners of trucks further information about the details of trucking runs that are currently unavailable. Upon the occurrence of a monitored event, e.g., opening of passenger door 112, an unauthorized function message is sent by controller 12 to control center 18, and a disable signal is sent to valve 108 to disable truck 106.

The system as described can be used with other vehicles and object other than a trailer 100 and truck 106. For example, the system can be programmed into several modes to protect passenger cars, boats, airplanes, houses, warehouses, and other objects that protection from theft or remote sensing of information is desired for.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A vehicle theft preventing or deterring method operable with a communication station located remotely with respect to the vehicle, comprising the steps of:

setting a controller coupled to the vehicle in one of a plurality of predefined operating modes, said plurality of operating modes including at least a first mode and a second mode;

detecting the closed state of at least one vehicle door;

transmitting a signal reporting the closed door state from a transceiver coupled to the vehicle to the communication station, in response to detecting of the closed state of the at least one vehicle door;

detecting the open state of at least one vehicle door following the detection of the closed state of the at least one vehicle door;

transmitting a signal reporting the open state of the vehicle door from the transceiver to the communication station, in response to detecting of the open state of the at least one vehicle door following the detection of the closed state of the at least one vehicle door;

generating an actuator control signal from the controller, when the controller is in the second mode and upon the detection of the open state of at least one vehicle door following the detection of the closed state of the at least one vehicle door, and refraining from generating an actuator control signal from the controller when the controller is in the first mode; and activating an actuator coupled to the vehicle, in response to the actuator control signal, the actuator performing a function to at least partially disable the vehicle.

2. A method as recited in claim 1, wherein said step of setting a controller comprises the steps of:

receiving program information from the communication station with a transceiver coupled to the vehicle; and setting the controller mode based on said program information.

\* \* \* \* \*